United States Patent Office 3,296,322
Patented Jan. 3, 1967

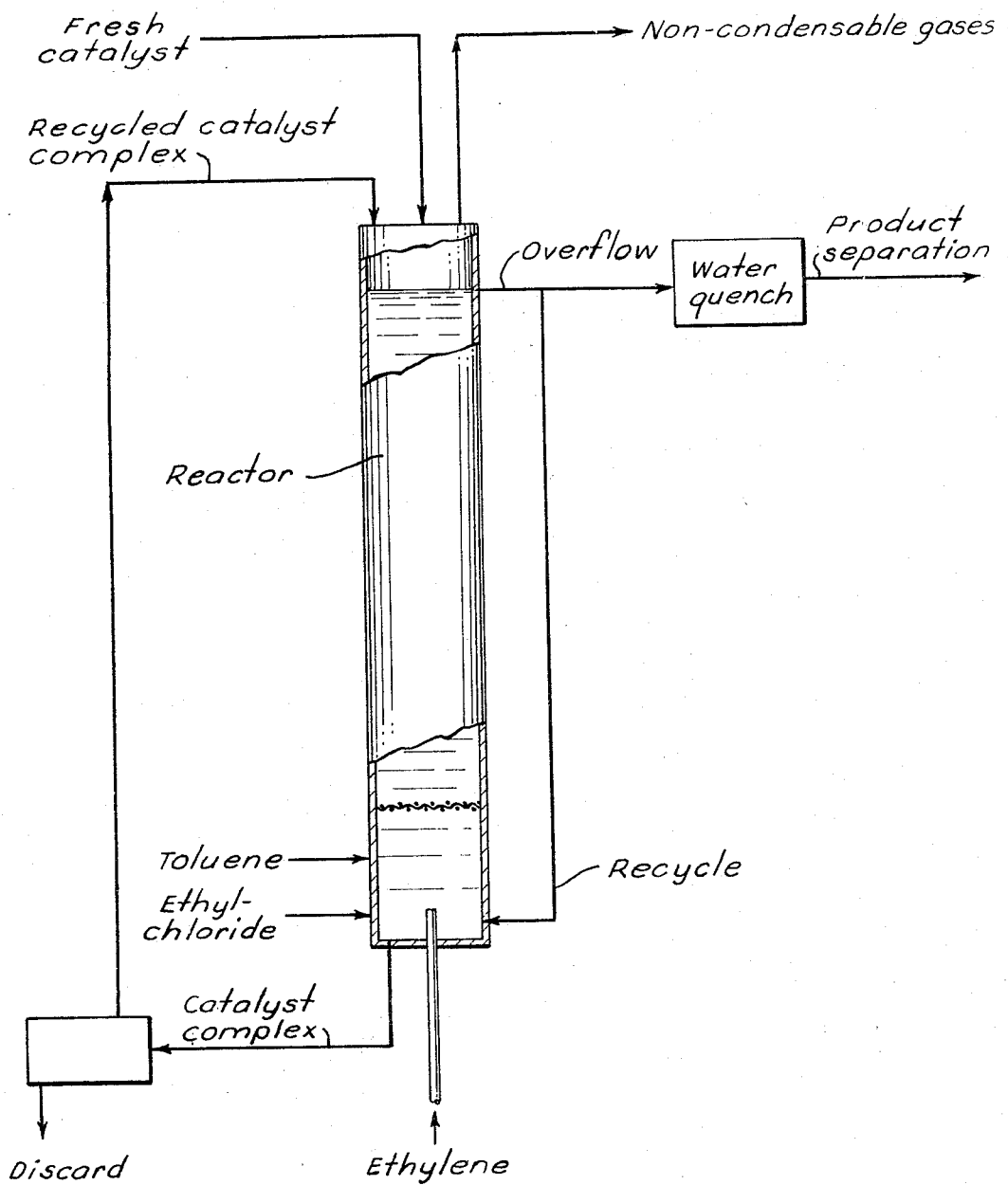

3,296,322
PREPARATION OF ORTHO-ETHYLTOLUENE
Frederick J. Soderquist, Essexville, and James L. Amos and Robert H. Allen, Midland, Mich., assignors to The Dow Chemical Company, Midland, Mich., a corporation of Delaware
Filed Nov. 7, 1963, Ser. No. 322,089
6 Claims. (Cl. 260—671)

This invention concerns an improved method for the preparation of ortho-ethyltoluene from ethylene and toluene starting materials. More specifically, the invention concerns a method for the continuous preparation of mono-ethyltoluene containing a high percentage of the ortho isomer.

Polymers prepared from nuclear methylated styrene monomer containing a methyl constituent ortho to the vinyl group display a high resistance to heat distortion. Where vinyltoluene is employed as the monomer, this property increases to a maximum value when pure ortho-vinyltoluene is employed. It is therefore advantageous, in an ethylation of toluene process, to obtain maximum yield of the ortho-ethyltoluene precursor.

At thermodynamic equilibrium, the isomeric distribution in mono-ethyltoluene has been calculated as 8 percent ortho, 48 percent meta and 44 percent para. See, Journal of Research (National Bureau of Standards) 37, 95 (1946). When ethylene and toluene are reacted, the mono-ethyltoluene product first formed contains a high percentage of ortho isomer which tends to rapidly isomerize towards the equilibrium distribution. In actual practice the isomer distribution resulting from prior art methods for the mono-ethylation of toluene generally falls within the range of 40–70 percent meta, 20–35 percent para and 10–25 percent ortho. Thus, in previously known commercial processes, the ortho-ethyltoluene required for the production of ortho-vinyltoluene monomer is a minor constituent of the mono-ethyltoluene product.

It is an object of the present invention to provide an improved method for the ethylation of toluene which yields a mono-ethyltoluene product containing a high percentage of the ortho isomer. It is another object of this invention to provide a continuous process for the preparation of ortho-ethyltoluene in commercial quantities. Other objects and advantages will become apparent after consideration of the following specification and claims.

In the general method of the present invention, high yields of ortho-ethyltoluene are obtained in a mono-ethyltoluene product by contacting ethylene and toluene in the presence of a suitable catalyst under selected alkylation conditions in a continuous process.

The sole figure of the accompanying drawing is a schematic diagram representing one embodiment of the present invention. In this diagram of a continuous process for practice of the present invention, toluene, ethylene, and ethyl chloride are fed at controlled rates into the lower portion of a reactor equipped with suitable temperature control means. A fresh quantity of a solid Friedel-Crafts catalyst is periodically introduced into the upper portion of the reactor. The solid catalyst granules are retained on a grid in the reactor until they have reacted with ethyl chloride to form an activated Friedel-Crafts catalyst which is a liquid catalyst complex. This activated catalyst is continuously withdrawn as it collects at the bottom of the reactor with a portion being optionally recycled into the upper part of the reactor to furnish a part of the catalyst needed for the alkylation process. Suitable agitation and mixing of the reactor contents is accomplished by the gas lift effect resulting from the introduction of ethylene at the bottom of the reactor. Non-condensable gases are withdrawn through an outlet at the top of the reactor. A mixture of reactants and crude alkylate product is removed as an overflow through an outlet in the upper portion of the reactor. A portion of this overflow is preferably recycled to the bottom of the reactor. This recycling permits control of the average residence time of the reactants in the reactor and facilitates removal of catalyst complex which tends to settle, in in the recycle leg, in a non-dispersed phase that is delivered to the base of the reactor and withdrawn. The remainder of the overflow is passed into an aqueous solution which quenches any remaining catalyst complex present thus preventing further isomerization of the desired ortho-ethyltoluene product. A fractional distillation process is then employed to recover the ortho-ethyltoluene fraction.

The ethylation of toluene is effected in the presence of a Friedel-Crafts catalyst, preferably aluminum chloride, which is activated in known manner with hydrogen chloride or ethyl chloride. It is an essential feature of the present invention that the liquid catalyst complex which is thus formed is removed as rapidly as it collects at the bottom of the reactor since this catalyst complex, which facilitates the reaction of ethylene and toluene, also facilitates the isomerization of the ortho-ethyltoluene to the meta and para forms. The rapid removal of the Friedel-Crafts catalyst complex prevents prolonged contact with the desired isomer product and enables the recovery of high percentages of ortho-ethyltoluene.

Generally, mild alkylation conditions are employed to minimize the rate of isomerization of the ortho-ethyltoluene initially formed as the major isomer product. The reactor contents are maintained at a temperature of from about 25° to 90° C. during the alkylation process with a temperature of from about 50° to 70° C. preferred. Atmospheric pressure is normally used although higher or lower pressures may be employed.

A quantity of Friedel-Crafts catalyst and recycled catalyst complex in the range of from about 1 to 10 grams per mole of toluene feed is employed in the method of the present invention with at least a part of this total consisting of fresh catalyst which is periodically added to the reactor during the continuous alkylation process together with hydrogen chloride or ethyl chloride to yield the activated catalyst.

A quantity of from about 1.5 to 6 moles of toluene per mole of ethylene is employed. Although a higher ratio of toluene may be employed, there is no advantage in doing so.

The average residence time of the reactants in the reactor may range from about ten minutes to ten hours although a time of from about two to six hours is preferred.

The various conditions discussed above are inter-related and optimum values of one condition depend on those values adopted for others. Thus, when larger amounts of catalyst are employed, lower temperatures and residence times may be suitable. Conversely, as the temperature is increased, less catalyst and/or a shorter residence time is necessary to achieve the desired results.

The following examples describe completely representative specific embodiments of the present invention. These examples, however, are not to be interpreted as limiting the invention other than as defined in the claims.

EXAMPLE 1

A quantity of 276 grams of toluene per hour was metered into the bottom portion of a reactor at a constant rate by means of a positive displacement pump. A quantity of 15.5 grams per hour of cylinder ethylene was simultaneously fed at a controlled rate via a manometer, through a wet test meter, through a dryer and finally to an injection port at the extreme bottom of the reactor. Aluminum chloride and ethyl chloride were fed into the reactor at rates equal to 5.0 and 2.5 grams/hour, respectively. The reactor was equipped with heating and cooling means and contained a grid about four inches above the reactor bottom to support the periodically added aluminum chloride crystals until they had reacted with the ethyl chloride to form liquid catalyst complex. The complex so formed was removed from the bottom of the reactor as rapidly as it accumulated.

During the course of this continuous reaction the temperature was maintained at 60° C. Non-condensible gases were withdrawn through a reflux condenser, conducted to an HCl scrubber and then to a wet test meter before being vented to the atmosphere. Crude alkylated product was continuously withdrawn from the reactor by a simple overflow outlet near the top of the reactor and conducted through a trap leg to a cooling condenser and into a wash and decanting vessel. In this vessel the crude alkylate was contacted with wash water to remove the last traces of catalyst. The crude product was then separated into its various components by fractional distillation.

Approximately 19 weight percent of the crude alkylate was mono-ethyltoluene with an isomer distribution of 38.5 percent ortho, 33.7 percent meta and 27.8 percent para.

EXAMPLE 2

In Table I, below, the conditions employed in a series of experiments, utilizing the method of the present invention, are tabulated. The rate of feed of ethylene and catalyst, the temperature maintained during the alkylation and the amount of catalyst complex recycled were varied. In a number of runs a quantity of polyethyltoluene byproduct was recycled and introduced with the reactant feed to determine whether the production of ortho-ethyltoluene would be effected. Table II, below, shows the crude alkylate composition and the isomer distribution of the mono-ethyltoluene product fraction in each of the experimental runs listed in Table I.

Table I

[Feed rates—grams per hour [1]]

| Run No. | Temp. | $C_2H_4$ | $AlCl_3$ | Catalyst Complex | Polyethyltoluenes | Mol ratio, $C_2H_4$:Toluene |
|---|---|---|---|---|---|---|
| 1 | 60 | 15.5 | 5.0 | | | 0.184 |
| 2 | 60 | 17.5 | 5.3 | | | 0.208 |
| 3 | 60 | 25.4 | 9.4 | | | 0.303 |
| 4 | 60 | 37.7 | 25.0 | | | 0.449 |
| 5 | 60 | 44.2 | 22.9 | | | 0.527 |
| 6 | 60 | 22.3 | 3.0 | | 6% of Toluene | 0.265 |
| 7 | 60 | 24.6 | 7.9 | | do | 0.292 |
| 8 | 60 | 25.5 | 5.0 | | do | 0.304 |
| 9 | 60 | 27.3 | 15.0 | | do | 0.308 |
| 10 | 70 | 23.3 | 5.0 | 12.2 | | 0.278 |
| 11 | 50 | 23.7 | 10.0 | 12.2 | | 0.282 |
| 12 | 60 | 24.9 | 10.0 | 12.2 | | 0.297 |

[1] The feed rate of toluene in each run was 276 grams per hour. The feed rate of ethyl chloride in each run was 2.5 grams per hour.

Table II

| Run No. | Crude Product Analysis—Wt. Percent | | | | | Isomer Distribution—Mono-Ethyltoluene Fraction | | |
|---|---|---|---|---|---|---|---|---|
| | Toluene | Ethyltoluene | | | | | | |
| | | Ortho | Meta | Para | Poly | Ortho | Meta | Para |
| 1 | 78.6 | 7.2 | 6.3 | 5.2 | 2.7 | 38.5 | 33.7 | 27.8 |
| 2 | 81.0 | 6.7 | 5.1 | 4.5 | 2.7 | 41.1 | 31.3 | 27.6 |
| 3 | 79.5 | 7.0 | 4.3 | 4.9 | 4.3 | 43.2 | 26.5 | 30.3 |
| 4 | 69.0 | 8.7 | 8.9 | 7.8 | 5.6 | 34.2 | 35.0 | 30.8 |
| 5 | 71.5 | 9.2 | 4.6 | 5.9 | 8.8 | 46.7 | 23.3 | 30.0 |
| 6 | 79.1 | 5.5 | 8.2 | 5.3 | 1.9 | 28.9 | 43.1 | 28.0 |
| 7 | 78.2 | 6.2 | 4.6 | 4.8 | 6.2 | 39.8 | 29.5 | 30.7 |
| 8 | 70.4 | 7.8 | 8.6 | 8.4 | 4.8 | 31.5 | 34.7 | 33.8 |
| 9 | 78.6 | 6.8 | 4.1 | 4.9 | 5.6 | 43.0 | 25.9 | 31.1 |
| 10 | 74.7 | 7.3 | 8.0 | 6.7 | 3.3 | 33.2 | 36.4 | 30.4 |
| 11 | 81.6 | 6.7 | 4.0 | 4.2 | 3.5 | 45.0 | 26.9 | 28.1 |
| 12 | 75.3 | 8.2 | 5.8 | 6.3 | 4.4 | 40.4 | 28.6 | 31.0 |

EXAMPLE 3

In each of the experiments of Example 2, i.e., Run No's. 1-12, the catalyst complex not recycled was accumulated and analyzed. These results indicate the trend towards isomerization of the ortho isomer when allowed to remain in prolonged contact with the catalyst complex.

Table III

| Run No. | Complexed Catalyst Removal Rate, g./hr. | Complexed Hydrocarbon Analysis, Weight Percent | | | |
|---|---|---|---|---|---|
| | | Toluene | Ethyltoluene | | |
| | | | Ortho | Meta and Para | Poly |
| 1 | 10 | 21.1 | 2.7 | 28.3 | 47.6 |
| 2 | 15.9 | 50.4 | 3.1 | 26.0 | 20.5 |
| 3 | 32 | 38.9 | 1.7 | 4.8 | 54.3 |
| 4 | 75 | 31.4 | 3.0 | 25.4 | 40.2 |
| 5 | 94 | 62.1 | 5.1 | 24.8 | 8.0 |
| 6 | 9 | 37.8 | 2.0 | 17.0 | 43.2 |
| 7 | 23.7 | 40.1 | 2.0 | 17.5 | 40.4 |
| 8 | 15 | 32.7 | 2.7 | 24.0 | 40.6 |
| 9 | 45 | 51.3 | 2.1 | 18.7 | 27.9 |
| 10 | 15 | 57.4 | 2.0 | 17.8 | 22.7 |
| 11 | 30 | 8.9 | 4.6 | 41.7 | 44.8 |
| 12 | 30 | 32.2 | 3.5 | 31.5 | 32.8 |

We claim:
1. A continuous process for preparing ortho-ethyltoluene, which process comprises:
  (A) feeding ethylene and toluene reactants, in a ratio of about 1.5 to 6.0 moles of toluene per mole of ethylene, into a reaction zone maintained at a temperature of from about 20° to 90° C.,
  (B) providing a dispersion of from about 1 to 10 grams of an activated Friedel-Crafts catalyst per mole of toluene fed to said reaction zone,
  (C) removing all of said activated catalyst settling out of said reaction zone in a non-dispersed phase immediately upon formation thereof,
  (D) withdrawing a mixture of unreacted toluene, mono-ethyltoluene and polyethyltoluenes from said reaction zone at a rate which provides for an average residence time of said reactants of from about 10 minutes to 10 hours,
  (E) neutralizing any of said catalyst present in said mixture immediately upon withdrawal thereof, and
  (F) separating said mixture by fractional distillation whereby an improved yield of ortho-ethyltoluene product is obtained.

2. The method of claim 1 wherein said activated Friedel-Crafts catalyst is activated aluminum chloride.

3. The method of claim 2 wherein said temperature is from about 50° to 70° C.

4. The method of claim 3 wherein said average residence time is from about six to eight hours.

5. The method of claim 1 wherein a portion of said activated catalyst removed is recycled through said reaction zone.

6. The method of claim 1 wherein a portion of said mixture of toluene, mono-ethyltoluene and poly-ethyltoluenes withdrawn from said reaction zone is recycled into said reaction zone.

References Cited by the Examiner

UNITED STATES PATENTS

| 2,198,595 | 4/1940 | Amos et al. | 260—671 |
| 2,763,702 | 9/1956 | Amos et al. | 260—671 |

DELBERT E. GANTZ, *Primary Examiner.*

C. R. DAVIS, *Assistant Examiner.*